W. H. POWELL.
INDUCTION MOTOR.
APPLICATION FILED MAR. 4, 1911.

1,080,475.

Patented Dec. 2, 1913.

Witnesses
Rob. E. Stoll.
Chas. L. Byron

Inventor
William H. Powell
By Chas. E. Lord
Attorney

UNITED STATES PATENT OFFICE.

WILLIAM H. POWELL, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

INDUCTION-MOTOR.

1,080,475.

Specification of Letters Patent.

Patented Dec. 2, 1913.

Application filed March 4, 1911. Serial No. 612,416.

*To all whom it may concern:*

Be it known that I, WILLIAM H. POWELL, a citizen of the United States, residing at Milwaukee, in the county of Milwaukee and State of Wisconsin, have invented certain new and useful Improvements in Induction-Motors, of which the following is a full, clear, and exact specification.

This invention relates to dynamo-electric machines, and more particularly to means for providing good electrical connections between conducting members of such machines.

The object of this invention is to improve the effectiveness of electrical connections between conducting members of dynamo-electric machines, particular attention being directed to connections between conducting bars and short-circuiting rings of squirrel cage windings. This object is accomplished by forcing and retaining the conducting bars and short-circuiting rings of the squirrel cage winding in intimate contact with each other by means located exterior to the bars. By means of such an arrangement the effectiveness of the electrical connections is increased, due to the fact that the contacting area is increased and the resistance of the connections decreased.

The various novel features of this invention will be described in the specification and particularly set forth in the appended claims.

This invention is illustrated on the accompanying sheet of drawings, in which—

Figure 1:
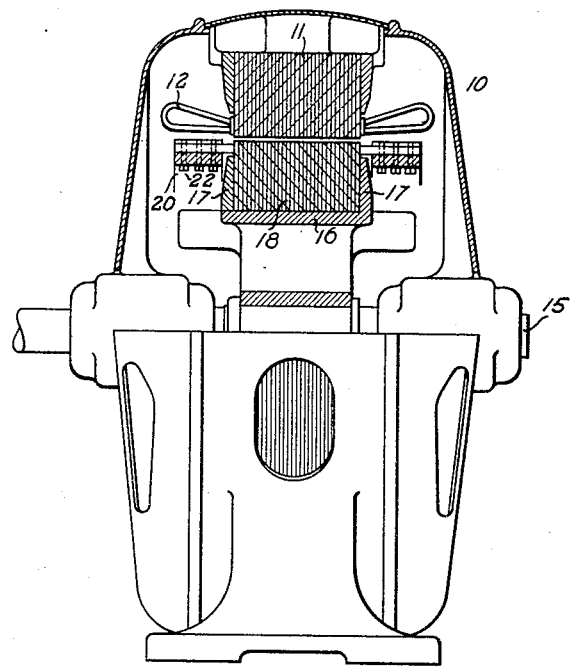
Figure 2:
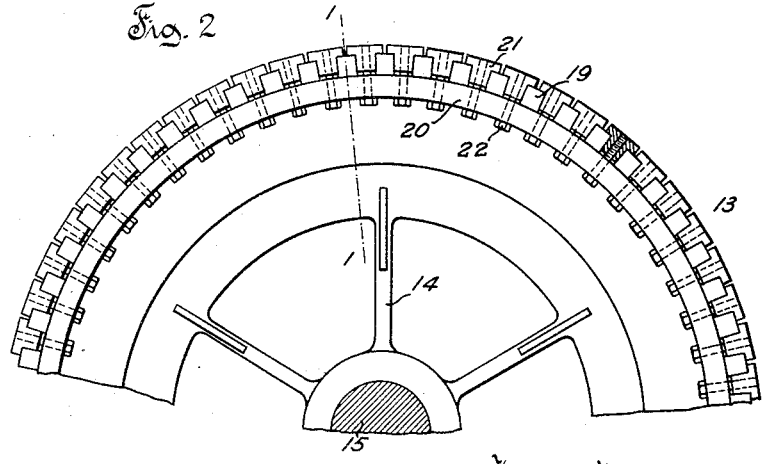

Figure 1 is a front elevation, partly in section, the section being taken along the line 1—1 of Fig. 2, of a squirrel cage induction motor embodying my invention; and Fig. 2 is an enlarged fragmentary side elevation, partly in section, of the rotating member of the induction motor shown in Fig. 1.

While I have shown my invention as applied to the rotating member of a dynamo-electric machine, I do not intend to limit my invention as applied to the rotating member, for it can be used equally as well in a squirrel cage winding on the stator.

The dynamo-electric machine illustrated in the figures of the drawing comprises a stator 10, including a core 11, with the regular winding 12. The rotating member 13 includes a spider 14 mounted on a shaft 15. Mounted on the rim 16 of the spider and between end plates 17 is a laminated core 18. This laminated core is provided with conducting bars which form part of a squirrel cage winding. At opposite sides of the core 18 and pressed into engagement with the conducting bars are short-circuiting rings 20 which also form part of the squirrel cage winding.

There are many different ways in which conducting bars and short-circuitings of the squirrel cage winding of an induction motor can be connected. In most every case connections between conducting bars and short-circuiting rings are effected by passing bolts through said bars and rings. While an effective connection is obtained by passing bolts through the bars and short-circuiting rings, I propose to effect a secure and reliable connection between the conducting bars and short-circuiting rings of the squirrel cage winding without passing members through said conducting bars. In this way the effective contacting surface is increased and the resistance of the connections decreased, making such connections ideal from a practical standpoint.

The conducting bars 19 are preferably substantially rectangular in section with the surfaces of the conducting bars which engage the short-circuiting rings slightly curved to conform with the outer surface of said short-circuiting rings. In accordance with this invention, conducting and retaining members 21, preferably T-shaped in section, are located between adjacent conducting bars, and bolts 22 passed through the short-circuiting rings 20 and retaining members 21 to draw said retaining members 21 into intimate contact with the conducting bars to force and retain said conducting bars in good electrical contact with the short-circuiting rings 20. The upper parts of the T-shaped members 21 lap over and engage the outermost surfaces of adjacent conducting bars and the other or radially extending portions of the T-shaped members 21 engage adjacent sides of adjacent conducting bars. These radially extending retaining members 21 are drawn in a radial direction when the bolts 22 are tightened to produce an efficient connection between the conducting bars and short-circuiting rings. The conducting bars and retaining members are arranged alternately around the periphery of the rotating member so that each conducting bar is engaged by adjacent retaining members 21 and each retaining member engages adjacent conducting bars. The effective contacting surfaces of the connections are materially increased for the reason that one side of each of the conducting bars is pressed into intimate contact with the short-circuiting rings, two of the other sides of each conducting bar being engaged for a considerable distance axially of the machine by the radially extending portion of the retaining members, and the fourth side of said conducting bars being engaged by the circumferentially extending portions of the retaining members. It is therefore seen that the effectiveness of the connections between the conducting bars and short-circuiting rings is practically a maximum. However, the connections would be highly efficient even if the radially extending portions of the retaining members 21 did not engage the radially extending sides of the conducting bars 19 for the total contacting surface would still be greater than that in ordinary constructions. The retaining members 21 may also be wedge members, as indicated, which when drawn tight effect a secure electrical connection between the conducting bars and short-circuiting rings, and also rendering a reliable mechanical connection to meet all commercial requirements.

It is evident that there may be many modifications in the precise form and arrangement herein shown and described, and I intend to cover all such modifications which do not involve a departure from the spirit and scope of my invention as set forth in the appended claims.

What I claim as new is:

1. In an induction motor, a squirrel cage winding including conducting bars and short-circuiting rings, and means including members in electrical contact with the outermost sides and adjacent sides of adjacent conducting bars, securing said bars to said short-circuiting rings.

2. In an induction motor, a squirrel cage winding including conducting bars and short-circuiting rings, and members having wedge portions located between adjacent bars and being in electrical contact with the outer sides and with the adjacent sides of adjacent bars.

3. In an induction motor, a squirrel cage winding including conducting bars and short-circuiting rings, members having wedge portions located between adjacent bars, and means for drawing said members into electrical and mechanical engagement with the outer and with the radial sides of said bars.

4. In an induction motor, a squirrel cage winding including conducting bars and short-circuiting rings, and means in electrical engagement with the outer sides and with the adjacent substantially radial sides of adjacent bars for forcing said bars into engagement with said short-circuiting rings and securing said bars in place.

5. In an induction motor, an armature winding including a plurality of conducting bars at the periphery of said armature, a plurality of short-circuiting rings, and means for securing the end portions of said bars to said rings comprising members having portions engaging the outer sides of said bars and portions extending between adjacent bars, and means engaging said rings for drawing said members into engagement with the outer sides and with the substantially radial sides of adjacent bars and for securing said bars to said rings.

In testimony whereof I affix my signature, in the presence of two witnesses.

WILLIAM H. POWELL.

Witnesses:
CHAS. L. BYRON,
ROB. E. STOLL.

---

Copies of this patent may be obtained for five cents each, by addressing the "Commissioner of Patents, Washington, D. C."